UNITED STATES PATENT OFFICE.

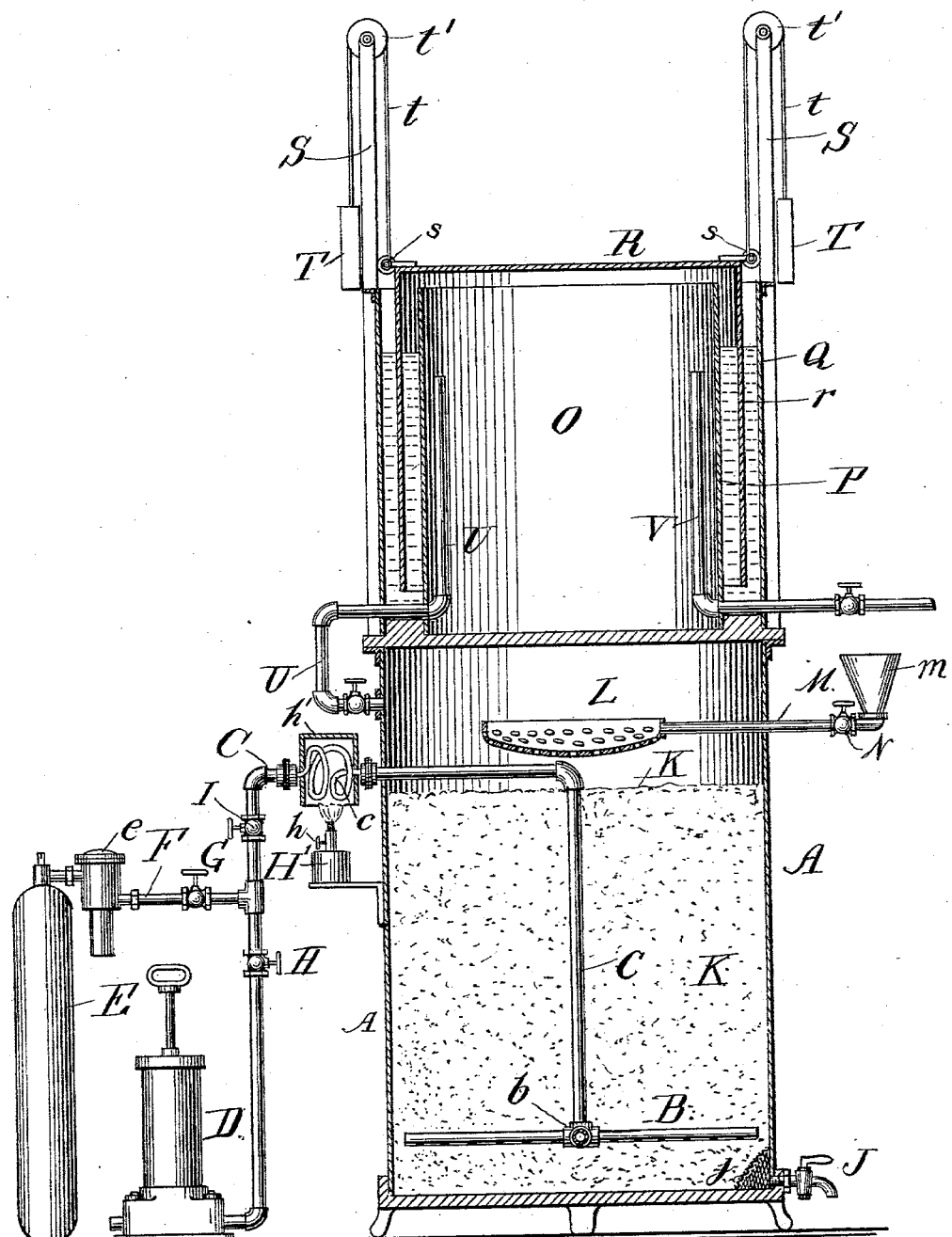

JAMES A. JENNEY, OF FAIRHAVEN, CONNECTICUT.

GAS-GENERATOR.

SPECIFICATION forming part of Letters Patent No. 716,716, dated December 23, 1902.

Application filed March 28, 1902. Serial No. 100,360. (No model.)

*To all whom it may concern:*

Be it known that I, JAMES A. JENNEY, a citizen of the United States of America, and a resident of Fairhaven, in the county of Bristol and State of Connecticut, have invented certain new and useful Improvements in Gas-Generators, of which the following is a specification.

My invention relates to the production of gas suitable for illuminating or heating purposes or combustion of any kind or for use in explosion-engines; and it comprises a new and improved means whereby air is brought into intimate contact with and caused to become more or less saturated with hydrocarbon vapor in a uniform and determinable manner, so as to produce the desired gas rapidly, economically, and of steady and reliable quality.

I am aware that it is not new to pass a current of air over an exposed body of hydrocarbon liquid—such, for instance, as gasolene—the air in its passage absorbing and carrying with it the volatile portions evaporating therefrom. With this arrangement the air is not particularly subdivided nor is the gasolene, and in hereinafter referring to "gasolene" I do so for convenience, meaning thereby to include all liquids or bodies capable of being employed in connection with my invention. The mere contact of a current of air with the surface of an exposed body of gasolene results in the absorption by the air of large quantities of gasolene under favorable circumstances, as when the latter is first exposed, and of gradually-decreasing quantities as the evaporation becomes slower with the increasing density of the liquid or a fall in its temperature. Furthermore, the air can only be carbureted at an indeterminable rate, depending upon the evaporation of the hydrocarbon.

On account of the danger attending the employment of exposed bodies of gasolene it has been usual to locate apparatus of the type referred to in places separate and away from the building to be lighted. With my improved carbureter this precaution is not required, since I do not use an exposed body of gasolene, and on this account the apparatus may be safely located in a dwelling-house—as, for instance, in the basement or cellar thereof—where the temperature will be favorable; but it is very advantageous to and by reason of the comparative absence of danger I am enabled to control the temperature at which the air is carbureted, and with this end in view provide my carbureter with a regulatable source of heat, which is preferably applied directly to the air-supply pipe, from which by the passage of the air heat is diffused as required and the hydrocarbon evaporated, even though refractory at ordinary temperatures.

According to my invention the hydrocarbon liquid is held in suspension in an absorbent mass of granular material, which material is packed into a suitable chamber. To produce gas, air under pressure is forced through the mass of granular material and during its passage is finely divided by the granular material and in its finely-divided condition absorbs hydrocarbon vapor, and if the mass of granular material be sufficiently large the air in its passage will absorb hydrocarbon to the limit of saturation. The gas is then conducted to a gas-holder, from which it may be distributed for use as an illuminator or for other purposes, and it may be conveyed directly to the point of use, as the cylinder of an explosion-engine. By subdividing the air and passing it through granular material which contains the hydrocarbon also in a finely-subdivided state the air is brought into such intimate contact with the gasolene and in such a subdivided condition that it cannot issue from the carbureter otherwise than as fully charged with hydrocarbon, assuming that this condition is desired and that the supply of the latter is sufficient and the retardation to the passage of the air is also sufficient to cause it to become diffused, and so penetrate the granular mass. When constructed on these principles, the carbureter becomes an instantaneously-acting device whereby gas can be produced in the shortest possible space of time and in a condition of such thorough admixture of hydrocarbon and air as to be ready for use immediately on leaving the carbureter. The gas can also be stored for further use. The compressed air may be forced into the carbureter by means of a hand-pump or may be supplied from a reservoir of compressed air suitably connected and controlled.

The accompanying drawing shows a vertical sectional elevation of a carbureter embodying my invention, together with a gas-holder connected therewith and means for supplying compressed air of the desired temperature to the carbureter.

In the drawing, A is a cylindrical tank. The particular shape of this tank is not essential. The form shown is, however, convenient and suitable. This tank may be arranged vertically or horizontally, as desired. Within the tank A and near to the bottom or one end thereof is located the air-distributing pipe B, which is desirably provided with four arms, of which three only are seen, extending from a central head b and perforated along their lower sides. The air-supply pipe C is connected with the head b and extends out from the tank A and is connected to the air-pump D and also, if desired, to an air-reservoir E through pipe F and stop-cocks G, H, and I. The tank A is also provided with a drainage-cock J at its lowest point, and the outlet through the cock J is protected upon the inside by a piece of wire-gauze j. At any suitable or convenient point in the pipe C is located a fold or coil c and a controllable source of heat therefor, as indicated by lamp H', having wick-adjuster h. A cover or hood h' may be placed over the coil c to concentrate and increase the effect thereon of the heating device. The tank A is filled up to near its top with a granular absorbent material which is not soluble in or otherwise injuriously affected by gasolene or the like. For this purpose I have used dry sawdust K and obtained good results therefrom. In the space above the sawdust K is located a pan L, the under side of which is perforated. The pipe M leads from the pan L to the outside, where it may be provided with a funnel m and a regulating-cock N. To charge the carbureter, the desired quantity of hydrocarbon liquid—as, for instance, gasolene—is introduced through the funnel m, pipe M, and distributer L, from which latter it is spread over the top of the sawdust K, passing therethrough and saturating the entire mass. It is not desired to have masses or bodies of gasolene anywhere about the carbureter, and therefore after the charge has been introduced if there be any surplus liquid it is drawn off through the drainage-cock J, leaving the mass K saturated with all of the hydrocarbon liquid that it can hold in suspension.

Although my invention is in no wise limited thereto, I have used and illustrate a gas-holder as mounted upon the top of the carbureter A. The gas-holder O comprises double exterior walls P Q, adapted to contain a quantity of water to form a water seal in connection with the movable upper portion, the bell R of the gas-holder, the sides of which fit in between the stationary sides P Q and are adapted to move up and down between suitable exterior guides S, according to the quantity of gas in the holder. The top of the bell R is provided with guide-rollers s, engaging the guides S, and counterweights T may also be provided and connected with the bell R by the cords t, running over pulleys t' on the top of the guides S, this arrangement being desirable where it becomes necessary to adjust the weight of the bell in order to determine the pressure at which the gas shall issue from the holder O. A pipe U extends from the upper part of the carbureter A to and some distance up into the gas-holder O, and a similar pipe V extends therefrom to convey the gas to the point of consumption.

In operation compressed air is supplied at the desired temperature to the distributer B, from which it issues and is forced upward through the granular mass K, being thereby finely divided and diffused through the said mass and issuing therefrom and reuniting in the form of carbureted air usually—that is, when the supply of hydrocarbon is sufficient and the supply of compressed air is properly adjusted—in a state of saturation, in which condition it passes, still under pressure, into the gas-holder O, which, the pressure being sufficient, is gradually filled until the bell R has reached the limit of its upward movement, when the supply of compressed air is stopped until so much has been used that the descent of the bell R of the gas-holder O indicates the necessity for a further supply, or, as is obvious, any of the well-known forms of pressure-gage may be attached to the gas-holder or to the carbureter to indicate the pressure existing therein.

While I have shown a hand-pump D as the simplest means of supplying compressed air to the carbureter, I may also use compressed air such as can be produced in charged flasks, one of which is indicated at E, using the same through a reducing-valve e and connected directly thereto and further connected through pipe F and cock G with the supply-pipe C. If it is desired to charge the flask E by means of the hand-pump D, this also can be accomplished by closing the cock I and opening the cocks G and H, when by operating the hand-pump for a few minutes a sufficient supply of compressed air can be stored to operate the carbureter long enough to store a supply of gas in the holder O, no further attendance being required than sufficient to store the air for the purpose of producing the gas by the operation of the carbureter, as described, or operating the pump until a sufficient supply of gas is stored.

My invention is not limited to the use of liquid hydrocarbons or liquids containing hydrocarbon of any specific density, since by using heated air in connection with the heavier and finely separated or divided hydrocarbons good results may also be obtained. It will be evident, therefore, that various minor modifications may be made in connection with my invention in view of the foregoing disclosure without departing therefrom.

Having described my invention, what I claim is—

The combination with a carbureter comprising a closed vessel partly filled with a granular absorbent material and having an oil-distributing device and a gas-conveying pipe above the material, of a perforated air-distributing pipe embedded in and near the bottom of the granular mass, a pipe leading therefrom to the exterior of the vessel, a reservoir of compressed air connected to said pipe, a pump for charging said reservoir, and valved connections whereby compressed air is supplied to the carbureter from the reservoir, or the reservoir cut off and the carbureter supplied by the pump direct.

Signed at New York, N. Y., this 27th day of March, 1902.

JAMES A. JENNEY.

Witnesses:
ERNEST H. PILSBURY,
FRANKLAND JANNUS.